United States Patent
Dupper

(10) Patent No.: US 11,780,336 B2
(45) Date of Patent: Oct. 10, 2023

(54) BATTERY ASSEMBLY

(71) Applicant: VOLKSWAGEN AKTIENGESELLSCHAFT, Wolfsburg (DE)

(72) Inventor: Denis Dupper, Gifhorn (DE)

(73) Assignee: Volkswagen Aktiengesellschaft

( * ) Notice: Subject to any disclaimer, the term of this patent is extended or adjusted under 35 U.S.C. 154(b) by 620 days.

(21) Appl. No.: 16/877,846

(22) Filed: May 19, 2020

(65) Prior Publication Data
US 2020/0373531 A1  Nov. 26, 2020

(30) Foreign Application Priority Data
May 21, 2019 (DE) .......................... 10 2019 207 451

(51) Int. Cl.
| | |
|---|---|
| *H01M 50/224* | (2021.01) |
| *H01M 50/249* | (2021.01) |
| *H01M 50/262* | (2021.01) |
| *B60L 50/64* | (2019.01) |
| *B60K 1/04* | (2019.01) |

(52) U.S. Cl.
CPC ........... *B60L 50/64* (2019.02); *H01M 50/224* (2021.01); *H01M 50/249* (2021.01); *H01M 50/262* (2021.01); *B60K 2001/0438* (2013.01); *B60K 2001/0472* (2013.01); *H01M 2220/20* (2013.01); *Y02T 10/70* (2013.01)

(58) Field of Classification Search
CPC ... B60L 50/64; H01M 50/249; H01M 50/262; H01M 50/224; H01M 2220/20; B60K 2001/0438; B60K 2001/0472; Y02T 10/70
See application file for complete search history.

(56) References Cited

U.S. PATENT DOCUMENTS

| | | | |
|---|---|---|---|
| 9,444,082 B2 | 9/2016 | Tsujimura et al. | |
| 2010/0147608 A1 | 6/2010 | Okabe | |
| 2014/0045025 A1* | 2/2014 | Fritz | H01M 50/209 429/99 |
| 2019/0312246 A1* | 10/2019 | Sawatzki | B62D 21/157 |

FOREIGN PATENT DOCUMENTS

| | | |
|---|---|---|
| CN | 103534118 A | 1/2014 |
| DE | 112008001224 T5 | 4/2010 |
| DE | 102012001596 A1 | 8/2013 |
| DE | 102012017879 A1 | 3/2014 |
| DE | 102012021857 A1 | 5/2014 |
| DE | 102013008428 A1 | 12/2014 |
| DE | 102014017177 A1 | 6/2015 |
| DE | 102015213860 A1 | 1/2017 |
| JP | 2003045392 A * | 2/2003 |

OTHER PUBLICATIONS

English machine translation of Horiuchi et al. (JP 2003045392 A) (Year: 2003).*

* cited by examiner

Primary Examiner — Brian R Ohara
(74) Attorney, Agent, or Firm — BARNES & THORNBURG, LLP

(57) ABSTRACT

A battery assembly for installation into a battery structural space of a transportation vehicle body having a battery housing accommodating a number of battery modules, wherein the battery housing has a smaller dimension along a vehicle longitudinal direction than the battery structural space, such that a free space is formed in the battery structural space, and wherein a shear panel element is provided as an areal bridging and stiffening of the free space.

16 Claims, 6 Drawing Sheets

BATTERY ASSEMBLY

PRIORITY CLAIM

This patent application claims priority to German Patent Application No. 10 2019 207 451.0, filed 21 May 2019, the disclosure of which is incorporated herein by reference in its entirety.

SUMMARY

Illustrative embodiments relate to a battery assembly for installation into a battery structural space of a transportation vehicle body, having a battery housing in which a number of battery modules is accommodated. Illustrative embodiments furthermore relate to an electrically driven or driveable transportation vehicle, in particular, a hybrid or electric vehicle, having a battery assembly of the type, and to a modular battery assembly system.

BRIEF DESCRIPTION OF THE DRAWINGS

Exemplary embodiments will be discussed in more detail below on the basis of a drawing, in which.

DETAILED DESCRIPTION

Figure 1:
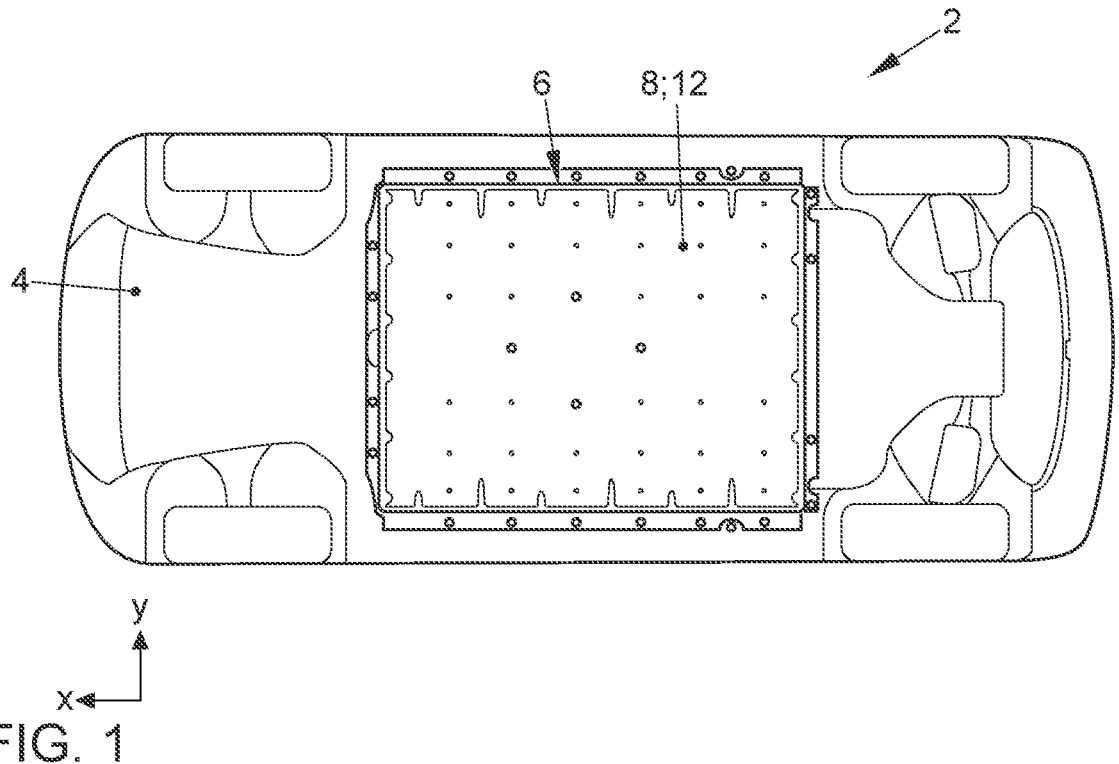
FIG. 1 is a plan view of a transportation vehicle having a transportation vehicle body and having a battery assembly of a high battery power level in a view directed toward a transportation vehicle underside.

Electrically or electromotively driven or driveable transportation vehicles, such as, for example, electric or hybrid vehicles, generally comprise an electric motor by which one or both vehicle axles can be driven. For the supply with electrical energy, the electric motor is commonly connected to a vehicle-internal (high-voltage) battery as an electrical energy store.

An electrochemical battery is to be understood here and below as a so-called secondary battery of the transportation vehicle. In the case of such a (secondary) vehicle battery, consumed chemical energy can be restored by an electrical charging process. Such vehicle batteries are designed, for example, as of electrochemical storage batteries, in particular, lithium-ion storage batteries. For the generation or provision of an adequately high operating voltage, such vehicle batteries typically have at least one battery module, in which multiple individual battery cells are interconnected in a modular manner.

In the production of electrically driven or driveable transportation vehicles, it is, for example, possible to use modular systems for the electric drive system and/or for the vehicle battery, such as, for example, the so-called "modularen E-Antriebs-Baukasten (MEB)" [modular electric drive platform], to thus improve flexibility and efficiency in the transportation vehicle building process.

Such a modular system for the vehicle battery has numerous different battery assemblies for the different (battery) power levels, which battery assemblies each have a different battery size. Here, the battery size is to be understood to mean the structural space requirement of the battery assembly, that is to say substantially the spatial measurement or dimensioning of a battery housing of the battery assembly in which the battery modules are arranged.

The power level of the vehicle battery or of the battery assembly is in this case substantially dependent on the number of coupled battery modules. Thus, a battery assembly of a high power level has a relatively large number of battery modules, for example, twelve battery modules, in a relatively large battery housing. Correspondingly, a battery assembly of a relatively low power level has a reduced number of battery modules, for example, seven, eight or nine battery modules, which are arranged in a relatively small battery housing.

For the use of such modular systems, it is, therefore, necessary for battery assemblies of different battery size to be installable into the same battery structural space. This means that a battery structural space, into which a battery assembly is to be installed or mounted, of a transportation vehicle body must always be designed for the highest power level of the modular system. The battery housing of the battery assembly with the highest power level thus substantially completely fills the available battery structural space, wherein a battery housing of a battery assembly of a power level reduced in relation thereto does not completely fill the available battery structural space. In this way, a gap or a free space, that is to say an unfilled clear spacing, is formed or left free between the battery housing of the relatively low power level and the edge (the inner wall) of the available battery structural space. In this way, a connection of the battery housing of the relatively low power level to the transportation vehicle body is not possible to the full extent, whereby, in the event of a transportation vehicle accident or a transportation vehicle collision (transportation vehicle crash), the mechanical structural integrity of the body or of the battery structural space is reduced. This furthermore gives rise to a reduction in torsional rigidity, in particular, in side impact strength, of the transportation vehicle. The reduced torsional rigidity has an adverse effect here on the driving characteristics and on driving comfort, and on the durability of the transportation vehicle.

DE 10 2015 213 860 A1 has disclosed a battery arrangement for a traction battery. Here, the traction battery has an I shape, which has a central, first battery region, extending in a vehicle longitudinal direction, and four second battery region extending to both sides thereof in a vehicle transverse direction. To improve the side impact strength of the traction battery, stiffening elements are provided which mechanically stiffen the inner corner regions of the I shape between the battery regions.

DE 10 2013 008 428 A1 has described an arrangement for the mounting of a vehicle battery, in the case of which arrangement, along two mutually opposite longitudinal sides, extending in a vehicle longitudinal direction, of a battery housing, in each case one deformation element is arranged between the battery housing and a transportation vehicle body.

DE 10 2012 021 857 A1 discloses a protective arrangement for protecting a vehicle battery in a transportation vehicle body, in the case of which protective arrangement, to form the battery structural space, two transverse supports running in a vehicle transverse direction and longitudinal support running in a vehicle longitudinal direction are provided. Here, one transverse support is formed as a protective wall, wherein the other supports form a framework.

Disclosed embodiments provide a particularly suitable battery assembly for installation into a battery structural space of a transportation vehicle body. It is sought to specify a battery assembly which, even for small battery sizes, ensures the highest possible mechanical structural integrity and torsional rigidity of the transportation vehicle body in the installed or mounted state. Disclosed embodiments also provide a particularly suitable electrically driven or driveable transportation vehicle having a battery assembly of the type, and a particularly suitable modular battery assembly system as a modular system.

This is achieved by a battery assembly, a transportation vehicle, and a battery assembly system. The refinements specified with regard to the battery assembly are analogously also transferable to the transportation vehicle and/or to the battery assembly system, and vice versa.

The disclosed battery assembly is suitable and configured for installation into a battery structural space of a motor vehicle body. Here, the battery assembly may be part of a modular battery assembly system, that is to say of a modular system for vehicle batteries.

The battery assembly has a battery housing in which a number of battery modules is accommodated. The battery housing has a smaller dimension along a vehicle longitudinal direction than the available battery structural space, such that a free space, that is to say a clear spacing, is formed or left free between the battery housing and a side wall of the battery structural space. The free space is thus a gap or an unfilled (sub-)region of the battery structural space. Thus, the battery assembly or the battery housing has a reduced structural size or battery size in relation to the measurements of the battery structural space. Here, the free space may be arranged at a rear end of the battery structural space or transportation vehicle body along the vehicle longitudinal direction, that is to say in the region of the vehicle rear wheels.

According to the disclosed embodiments, a shear panel element is provided as an areal bridging and stiffening of the free space. This means that the shear panel element is, in the mounted or installed state, inserted into the free space. Here, a bridging is to be understood to mean a force-transmitting connection between the battery housing and a side wall of the battery structural space, that is to say of the transportation vehicle body. The shear panel element thus provides an additional force path in the event of a transportation vehicle accident or transportation vehicle collision, whereby a high level of mechanical structural integrity and torsional rigidity of the transportation vehicle body is ensured. A particularly suitable battery assembly is thus realized.

By using the shear panel element, an inexpensive and weight-reduced bridging and stiffening, suited to the structural space, of the free battery structural space (free space) are realized.

Below, statements relating to the spatial directions, in particular, also in a coordinate system of the transportation vehicle (vehicle coordinate system), are given with regard to an exemplary installation situation of the battery assembly in a battery structural space arranged on an underlying-surface-facing side of the transportation vehicle body. The abscissa axis (X axis, X direction) is in this case oriented along the vehicle longitudinal direction (direction of travel), and the ordinate axis (Y axis, Y direction) is oriented along the vehicle transverse direction, and the applicate axis (Z axis, Z direction) is oriented along the transportation vehicle height.

The battery structural space is, for example, open at the underlying-surface-facing side, and is delimited by a transportation vehicle underbody. Thus, the battery assembly can be mounted or installed from the transportation vehicle underside. Here, the planar or curved shear panel element transmits shear loads acting in an XY plane, and thus has a positive effect on the torsional flexural buckling load-bearing capacity of the stability-jeopardizing free space, whereby the mechanical structural integrity and the torsional rigidity of the transportation vehicle body are improved.

In at least one disclosed embodiment, the shear panel element is fastened by screws or fastenable by screws to the battery housing and/or to the transportation vehicle battery. This means that the shear panel element is fixed in a force-fitting manner to the battery housing and/or to the transportation vehicle battery.

The conjunction "and/or" is to be understood here and below to mean that the features linked by this conjunction may be implemented both jointly and as alternatives with respect to one another.

A "force fit" or a "force-fitting connection" between at least two parts which are connected to one another is to be understood here and below to mean that the parts which are connected to one another are prevented from sliding against one another owing to a frictional force which acts between them. In the absence of a "connecting force" (that is to say the force which presses the parts against one another, for example, a screw force or the weight force itself) which gives rise to the friction force, the force-fitting connection cannot be maintained, and can thus be released.

A simple, reliable and operationally safe fastening of the shear panel element is realized by the screw fastening. In this way, a reliable connection in terms of forces to the battery housing and/or to the transportation vehicle body is realized, such that a reliable bridging and stiffening of the free space are ensured. The screw fastening is realized here optionally on two sides, on three sides or on all sides, that is to say along two, three or all side edges of the shear panel element.

In one expedient refinement, the shear panel element is designed as a metal shear plate. A particularly simple and inexpensive battery assembly is thus realized. The shear panel element, or the metal shear plate, is in this case designed, for example, as a punched and bent part. Here, the metal shear plate bridges the free space, for example, over a large area.

The shear panel element or the metal shear plate is produced, for example, from a steel or aluminum material.

In a disclosed embodiment, the shear panel element has a frame structure which is arranged at least at three sides, that is to say along at least three side walls, along the inner periphery of the free space. The shear panel element is thus bordered by the frame structure. Here, the frame structure has stout structural elements, for example, posts, beams or profiles, which exhibit relatively high rigidity under elongation in relation to the rest of the shear panel element. In this way, acting longitudinal forces are transmitted to the frame structure.

It is alternatively conceivable, for example, for the shear panel element to have a frame structure on all sides, that is to say a fully encircling frame structure.

In one possible configuration, the shear panel element is designed as struts or tie members which cross one another. A particularly material-saving and cost-reduced design of the shear panel element is realized in this way. A tie member or tension member is to be understood here to mean a component which accommodates tensile forces and has a relatively small thickness in relation to the length and, owing to the structural design, can accommodate higher tensile forces than compressive forces. Here, the shear panel element is produced, for example, from steel or aluminum or from a pre-stretched plastic.

In at least one disclosed embodiment, the shear panel element is designed as two struts or tie members which cross one another diagonally in the free space. The struts or tie members in this case cross one another as space diagonals of the free space. A particularly suitable refinement of the shear panel element is realized in this way.

In at least one disclosed embodiment, a second shear panel element is provided as an areal bridging and stiffening of the free space, wherein the shear panel elements are arranged in a manner spaced apart from one another along a vehicle transverse direction. Thus, a two-part shear panel is provided as an areal structure for bridging and stiffening of the free battery structural space. It is conceivable here that a single-part or two-part shear panel is provided as shear panel element depending on the size of the transportation vehicle body or of the battery structural space. A particularly flexible adaptation to different battery structural spaces is thereby possible.

In a disclosed embodiment, the above-described battery assembly is installed or mounted in a battery space of a transportation vehicle body of an electrically driven or driveable transportation vehicle, in particular, of an electric or hybrid vehicle. A particularly suitable transportation vehicle is realized in this way.

An additional disclosed embodiment provides for the above-described battery assembly to be part of a modular battery assembly system. The battery assembly system designed as a modular system is provided as a vehicle battery set for individual adaptation to different applications and requirements, in particular, with regard to different levels of battery power, of an electrically driven or driveable transportation vehicle, such that the system can be flexibly adapted to a desired application.

The disclosed battery assembly system comprises different battery assemblies, which differ with regard to a respective battery power level. The battery assemblies in this case each have a battery housing for accommodating a respective number of battery modules, wherein the battery housings of relatively high power levels have more battery modules and thus a larger battery size. The battery assembly system is in this case provided for installation into a battery structural space of a transportation vehicle body of a transportation vehicle.

Here, the battery structural space is adapted to the measurements and dimensions of the battery assembly of the highest battery power level. Thus, the battery structural space is configured for the battery size of the highest battery power level. This means that, in the case of such a (first) battery assembly being installed, the available battery structural space is substantially completely filled, that is to say no free space is formed.

The battery assembly system furthermore comprises at least one (second) battery assembly of a relatively low battery power level, which is designed as the battery assembly described above. Thus, in the case of such a (second) battery assembly of relatively low battery power level being used, the available free space of the battery structural space is bridged and stiffened by a shear panel element. In this way, problem-free battery assembly mounting and dismounting, and a flexible adaptation to different customer demands or requirement demands, are realized, which simultaneously ensures high mechanical structural integrity and torsional rigidity of the transportation vehicle body in the installed or mounted state.

In one conceivable refinement, the second battery assemblies in this case have fewer than twelve battery modules, for example, seven, eight or nine battery modules.

Parts and dimensions which correspond to one another are denoted by the same reference designations throughout all of the figures.

Figure 2:
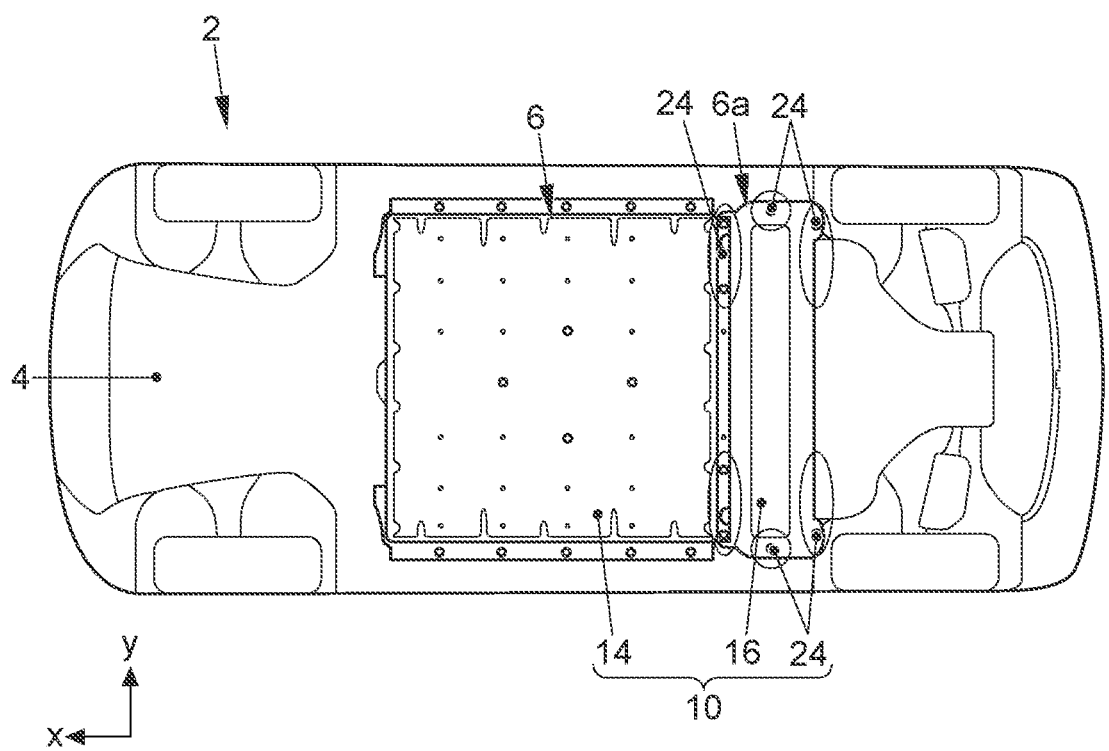
FIG. 2 is a plan view of the transportation vehicle of FIG. 1 having a battery assembly of a low battery power level with a battery housing and with a shear panel element, in a view directed toward a transportation vehicle underside.

FIG. 1 and FIG. 2 show a battery assembly system (not designated in any more detail), such as a modular system for vehicle batteries for installation in an electrically driven or driveable transportation vehicle 2. Here, the transportation vehicle 2 is, in particular, an electric or hybrid vehicle. The transportation vehicle 2 has a transportation vehicle body 4 with a battery structural space 6. Here, the battery structural space 6 is the structural space intended for the installation or the mounting of different battery assemblies 8, 10 of the battery assembly system. The battery structural space 6 is open at the underlying-surface-facing side and is delimited by a transportation vehicle underbody. Thus, the battery assemblies 8, 10 can be mounted or installed from the transportation vehicle underside. The battery assemblies 8, 10 are thus part of the transportation vehicle substructure.

The battery assemblies 8, 10 are implemented with different battery power levels. The (first) battery assembly 8 shown in FIG. 1 in this case has a high battery power level. The battery assembly 8 has a battery housing 12, in which a large number of battery modules (not shown in any more detail), for example, twelve battery modules, are inserted. As can be seen relatively clearly in FIG. 1, the battery housing 12 substantially completely fills the available battery structural space 6 of the transportation vehicle body 4. The battery structural space 6 of the transportation vehicle body 4 is dimensioned for the battery housing 12 of the high battery power level. Here, the battery housing 12 is connected or coupled over a full periphery, that is to say on all sides, to the transportation vehicle body 4.

The (second) battery assembly 10 shown in FIG. 2 has a reduced battery power level in relation to the battery assembly 8. The battery assembly 10 correspondingly has a smaller number of battery modules, that is to say fewer than twelve battery modules, for example, seven, eight or nine battery modules, whereby an associated battery housing 14 has a smaller or reduced battery or structural size.

Below, statements relating to the spatial directions, in particular, also in a coordinate system of the transportation vehicle (vehicle coordinate system), are given with regard to an exemplary installation situation of the battery assembly in a battery structural space arranged on an underlying-surface-facing side of the transportation vehicle body. The abscissa axis (X axis, X direction) is in this case oriented along the vehicle longitudinal direction (direction of travel), and the ordinate axis (Y axis, Y direction) is oriented along the vehicle transverse direction, and the applicate axis (Z axis, Z direction) is oriented along the transportation vehicle height.

The battery housing 14 has a reduced measurement along the vehicle longitudinal direction X in relation to the battery housing 12. In this way, the same available battery structural space 6 is not completely filled by the battery housing 14 of the battery assembly 10. This means that an unfilled, empty subregion remains in the battery structural space 6, the sub-region hereinafter also being referred to as free space 6a. As can be seen in FIG. 2, the free space 6a is in this case arranged at a rear end of the battery structural space 6 or transportation vehicle body 4 along the vehicle longitudinal direction X, that is to say in the region of the transportation vehicle rear end or of the transportation vehicle rear wheels.

In the event of a transportation vehicle accident or transportation vehicle collision, an empty free space 6a would adversely influence the mechanical structural integrity and the torsional rigidity of the transportation vehicle body 4, because the battery housing 14 cannot be coupled on all sides to the transportation vehicle body 4. To avoid these drawbacks, the battery assembly 10 has an additional shear panel element 16, which is provided for installation or mounting into the free space 6a. The shear panel element 16 lengthens the structural size of the battery assembly 10 along the vehicle longitudinal direction X, and enables the battery housing 14 to be connected at an end side to the transportation vehicle body 4.

By using the shear panel element 16, an inexpensive and weight-reduced bridging and stiffening, suited to the structural space, of the free battery structural space (free space) 6a are realized. Here, the shear panel element 16 transmits shear loads acting in an XY plane, and thus has a positive effect on the torsional flexural buckling load-bearing capacity of the stability-jeopardizing free space 6a, whereby the mechanical structural integrity and the torsional rigidity of the transportation vehicle body 4 are significantly improved. This is shown by way of example on the basis of FIGS. 3 and 4.

Figure 3:
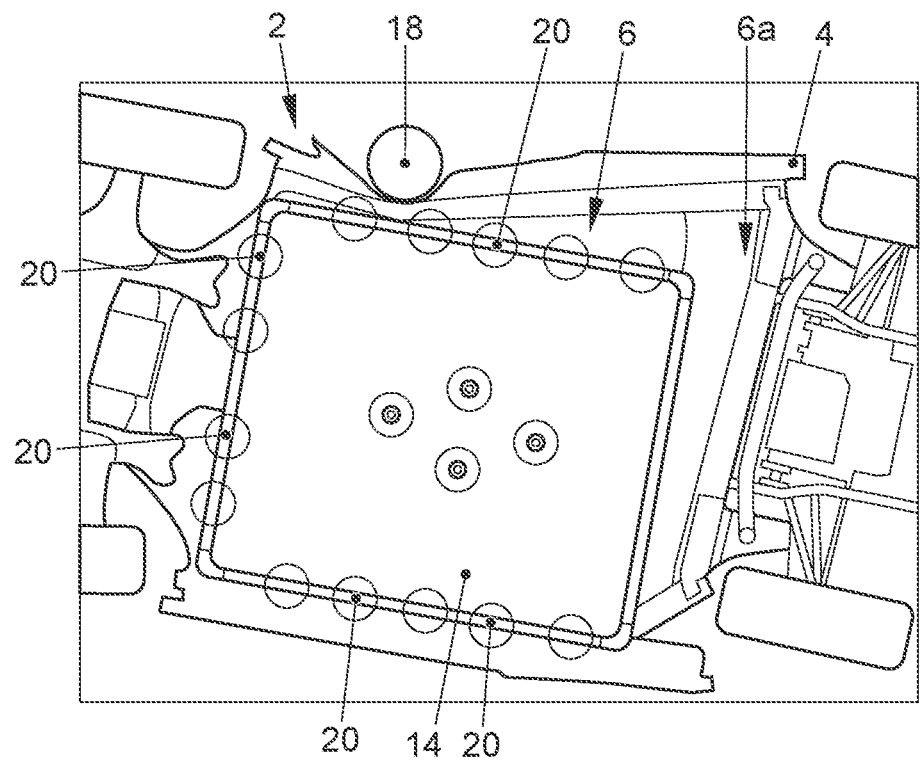
FIG. 3 is a diagrammatic illustration of the transportation vehicle body having the battery assembly of the low battery power level, without shear panel element, in the event of a side impact.

FIG. 3 shows the transportation vehicle body 4 in the event of a side impact (side crash) of an object 18 against a side surface of the transportation vehicle 2 if the free space 6a is empty, that is to say if the battery assembly 10 were installed without the shear panel element 16. As can be seen relatively clearly in FIG. 3, the battery housing 14 is fastened only on three sides to the transportation vehicle body 4 by fastening points 20. The fastening points 20 are illustrated in FIG. 3 as circles, and only examples thereof are denoted by reference designations.

The fastening points 20 are designed, for example, as screw connections. Owing to the absence of fastening points 20 in the region of the free space 6a, the other screw connections inadmissibly breakaway during a side impact, as a result of which the structural integrity of the transportation vehicle 2 is lost. Furthermore, the torsional rigidity or strength of the transportation vehicle 2 is significantly reduced.

Figure 4:
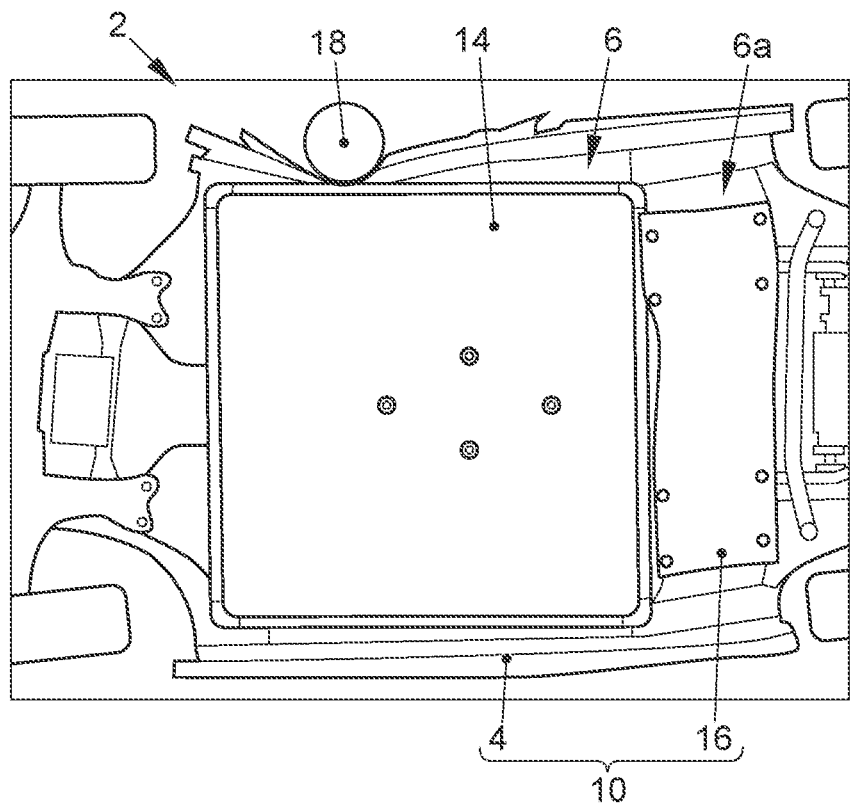
FIG. 4 is a diagrammatic illustration of the transportation vehicle body having the battery assembly of the low battery power level, with shear panel element, in the event of a side impact.

As can be seen relatively clearly in FIG. 4, the battery housing 14 is connected rearwardly and/or laterally to the transportation vehicle body 4 by the shear panel element 16, which is designed, for example, as a metal shear plate. The shear panel element 16 acts as an additional force path in the event of a transportation vehicle accident or transportation vehicle collision. In this way, the free space 6a is mechanically stiffened and bridged, such that the structural integrity is not adversely affected in the event of a side impact of the object 18.

Figure 5:
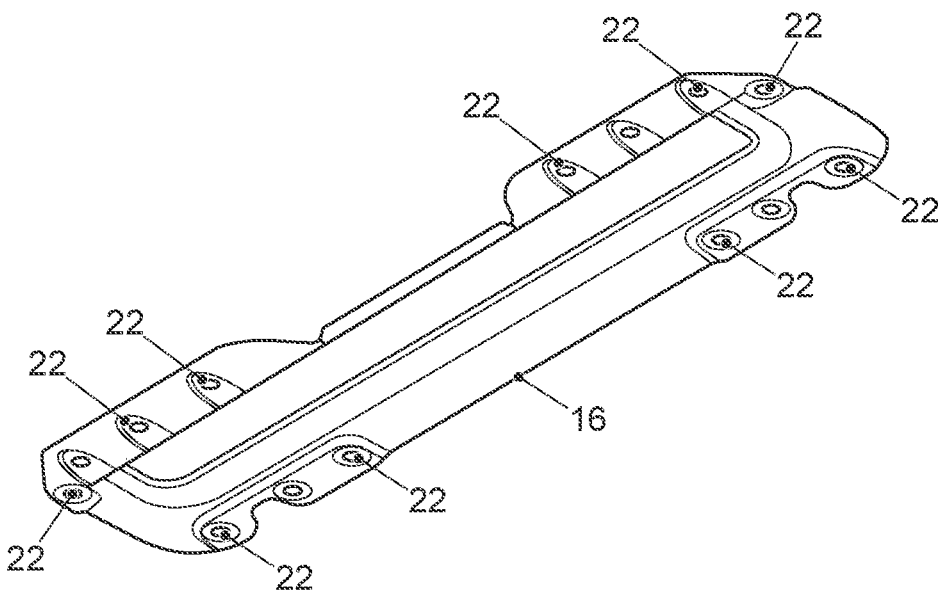
FIG. 5 is a perspective illustration of the shear panel element in a first embodiment.
Figure 6:
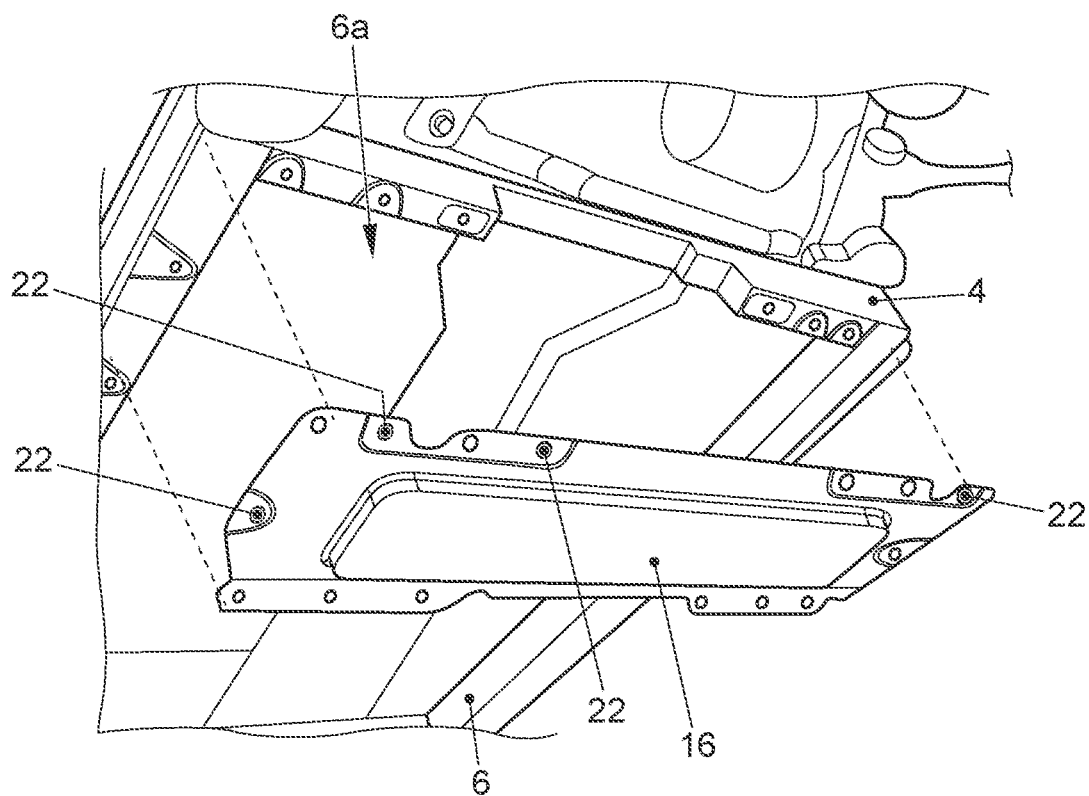
FIG. 6 is an exploded illustration of a detail of the transportation vehicle body with the shear panel element.
Figure 7:
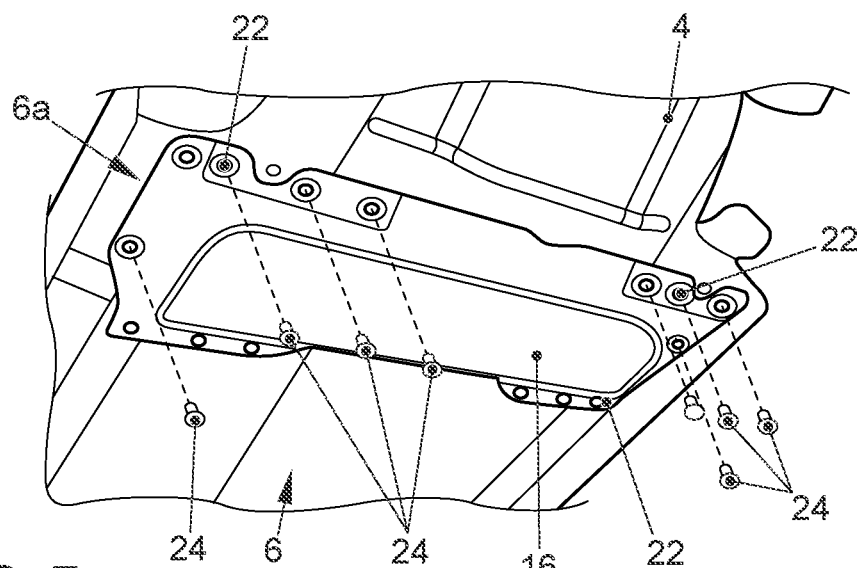
FIG. 7 is a perspective illustration of a detail of the transportation vehicle body with the shear panel element in a mounted state.

An exemplary embodiment of the shear panel element 16 will be discussed in more detail below on the basis of FIG. 5 to FIG. 7. The shear panel element 16 has an approximately rectangular basic shape, and approximately completely fills the free space 6a in the installed state. The shear panel element 16 is designed, for example, as a punched and bent part of a metal shear plate, and is provided with contours and embossments (not designated in any more detail) which realize a defined force path and thus a defined deformation in the event of an accident or impact.

The shear panel element 16 has, on all sides, fastening openings 22 for receiving fastening screws 24. The shear panel element 16 is connected or coupled by the fastening screws 24 to the battery housing 14 on one side and to the transportation vehicle body 4 on the other side. In the figures, only examples of the fastening openings 22 and fastening screws 24 are denoted by reference designations.

Figure 8:
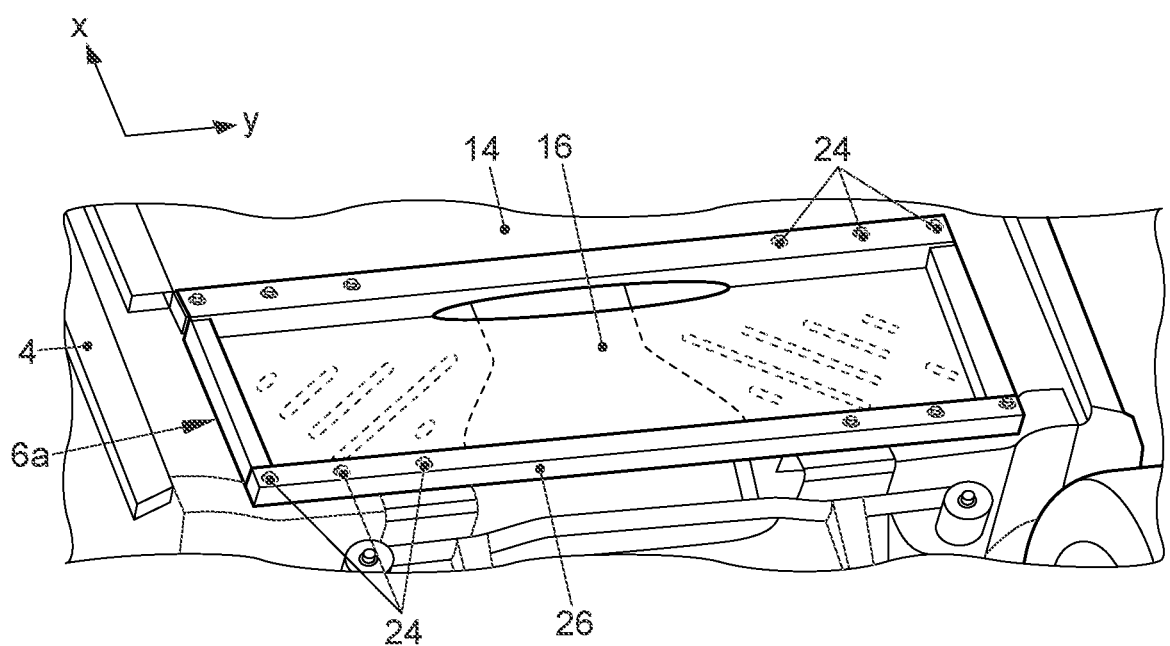
FIG. 8 is a perspective illustration of the shear panel element in a second embodiment.

FIG. 8 shows a further exemplary embodiment of the shear panel element 16. In this disclosed embodiment, the shear panel element 16 has a frame structure 26. The frame structure 26 has three struts or profiles which are arranged at three sides along the inner periphery of the free space 6a. A shear panel, for example, as a metal shear plate, is held between the struts of the frame structure 26.

Figure 9:
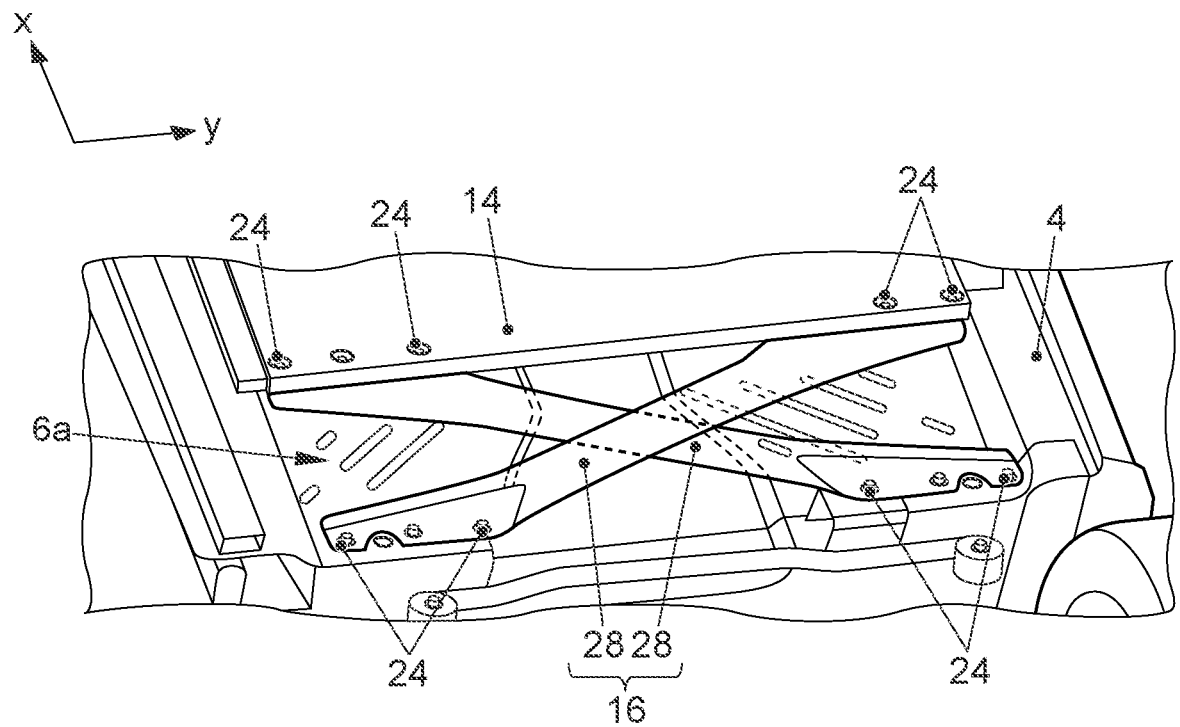
FIG. 9 is a perspective illustration of the shear panel element in a third embodiment.

FIG. 9 shows an alternative exemplary embodiment, in which the shear panel element 16 is designed as two struts or tie members 28 which cross one another. The tie members 28 in this case cross one another as space diagonals in the free space 6a.

Figure 10:
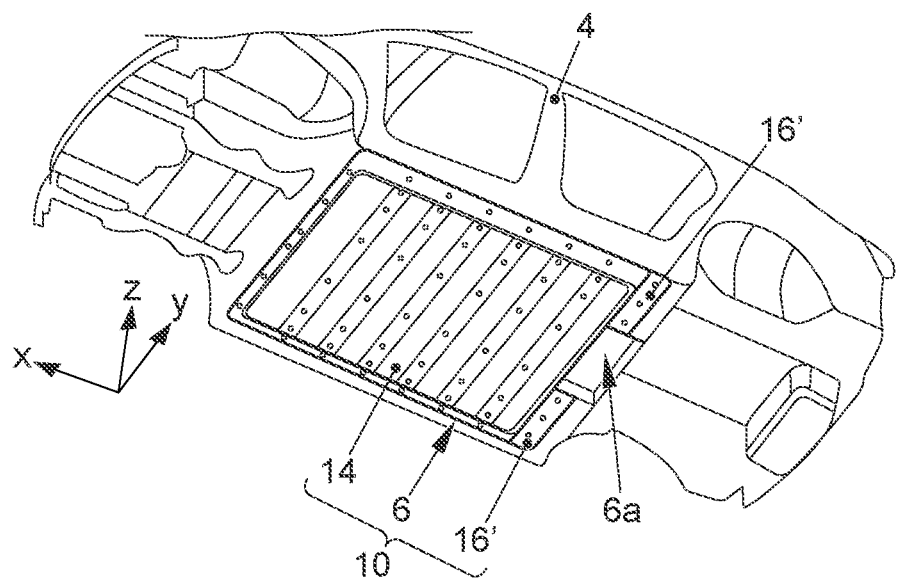
FIG. 10 is a perspective illustration of the transportation vehicle body with two shear panel elements in a fourth embodiment.
Figure 11:
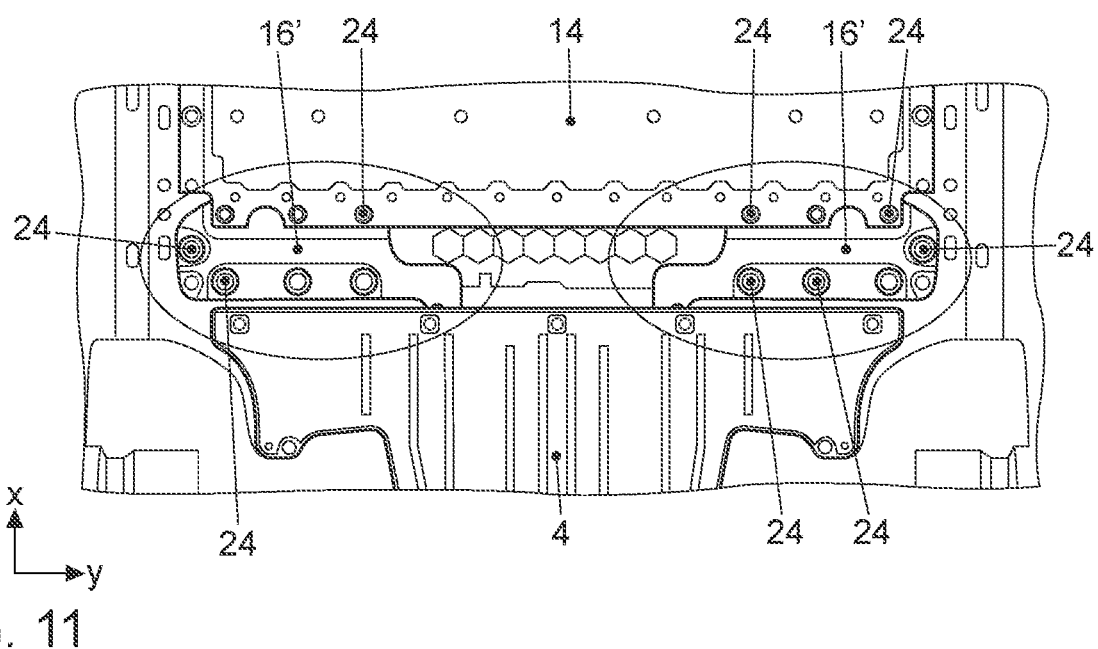
FIG. 11 is a plan view of a detail of the transportation vehicle body with two shear panel elements in a fifth embodiment.

FIGS. 10 and 11 illustrate a further exemplary embodiment. In this disclosed embodiment, two separate shear panel elements 16' are provided as an areal bridging and stiffening of the free space 6a. Thus, the shear panel of the battery assembly 10 is formed in two parts. Here, the shear panel elements 16' are configured, for example, as one of the exemplary embodiments described above. In the exemplary embodiment shown, the shear panel elements 16' are designed as the shear panel element 16 illustrated in FIGS. 5 to 7.

The disclosure is not restricted to the exemplary embodiments described above. It is rather also possible for other options to be derived therefrom within the scope of the disclosure by a person skilled in the art, without departing from the subject matter of the disclosure. All individual features described in conjunction with the various exemplary embodiments may furthermore also be combined with one another in some other way within the scope of the disclosed claims, without departing from the subject matter of the disclosure.

LIST OF REFERENCE DESIGNATIONS

2 Transportation vehicle
4 Transportation vehicle body
6 Battery structural space
6a Free space
8, 10 Battery assembly
12, 14 Battery housing
16, 16' Shear panel element
18 Object
20 Fastening point
22 Fastening opening 24 Fastening screw
26 Frame structure
28 Strut/tie member
X Vehicle longitudinal direction
Y Vehicle transverse direction
Z Vehicle vertical direction

The invention claimed is:

1. A battery assembly for configured installation into a battery structural space of a transportation vehicle body, the battery assembly comprising:
   a battery housing accommodating a plurality of battery modules, wherein the battery housing has a smaller dimension along a vehicle longitudinal direction than the battery structural space so that a free space is formed in the battery structural space; and
   a shear panel element configured to provide areal bridging and stiffening of the formed free space by transmitting shear loads to effect torsional flexural buckling load-bearing capacity of the formed free space.

2. The battery assembly of claim 1, wherein the shear panel element is fastened by screws or fastenable by screws to the battery housing and/or to the transportation vehicle body.

3. The battery assembly of claim 1, wherein the shear panel element is a metal shear plate.

4. The battery assembly of claim 1, wherein the shear panel element has a frame structure arranged or arrangeable at least at three sides along the inner periphery of the free space.

5. The battery assembly of claim 1, wherein the shear panel element includes struts or tie members which cross one another.

6. The battery assembly of claim 5, wherein the shear panel element is two struts or tie members which cross one another diagonally in the free space.

7. The battery assembly of claim 1, wherein a second shear panel element is provided as an areal bridging and stiffening of the free space, wherein the shear panel elements are arranged or arrangeable spaced apart from one another along a vehicle transverse direction.

8. An electrically driven or driveable transportation vehicle having a transportation vehicle body with a battery structural space and the battery assembly of claim 1 mounted in the battery structural space.

9. A modular battery assembly system configured for installation into a battery structural space of a transportation vehicle body of a transportation vehicle, the modular battery assembly system comprising:
   a first battery assembly of a first battery power level, with a first battery housing which substantially completely fills the battery structural space; and
   at least one second battery assembly of a relatively lower battery power level than the first battery power level,
   wherein the at least one second battery assembly includes a second battery housing accommodating a plurality of battery modules, wherein the second battery housing has a smaller dimension along a vehicle longitudinal direction than the transportation vehicle's battery structural space thereby forming a free space therein, and a shear panel element configured to provide areal bridging and stiffening of the formed free space by transmitting shear loads to effect torsional flexural buckling load-bearing capacity of the formed free space.

10. The battery assembly system of 9, wherein the plurality of battery modules includes fewer than twelve battery modules accommodated in the second battery housing.

11. The battery assembly system of claim 9, wherein the shear panel element is fastened by screws or fastenable by screws to the second battery housing and/or to the transportation vehicle body.

12. The battery assembly system of claim 9, wherein the shear panel element is a metal shear plate.

13. The battery assembly system of claim 9, wherein the shear panel element has a frame structure arranged or arrangeable at least at three sides along the inner periphery of the free space.

14. The battery assembly system of claim 9, wherein the shear panel element includes struts or tie members which cross one another.

15. The battery assembly system of claim 14, wherein the shear panel element is two struts or tie members which cross one another diagonally in the free space.

16. The battery assembly system of claim 9, wherein a second shear panel element is provided as an areal bridging and stiffening of the free space, wherein the shear panel elements are arranged or arrangeable spaced apart from one another along a vehicle transverse direction.

* * * * *